(12) United States Patent
Zanibelli et al.

(10) Patent No.: US 7,754,637 B2
(45) Date of Patent: *Jul. 13, 2010

(54) CATALYTIC COMPOSITION FOR THE UPGRADING OF HYDROCARBON MIXTURES

(75) Inventors: Laura Zanibelli, Crema (IT); Marco Ferrari, Milan (IT); Virginio Arrigoni, Milan (IT)

(73) Assignees: AGIP Petroli S.p.A., Rome (IT); Enitecnologie S.p.A., Milan (IT)

( * ) Notice: Subject to any disclaimer, the term of this patent is extended or adjusted under 35 U.S.C. 154(b) by 20 days.

This patent is subject to a terminal disclaimer.

(21) Appl. No.: 11/567,356

(22) Filed: Dec. 6, 2006

(65) Prior Publication Data

US 2007/0084756 A1 Apr. 19, 2007

Related U.S. Application Data

(60) Division of application No. 10/891,069, filed on Jul. 15, 2004, now Pat. No. 7,156,980, which is a continuation of application No. 09/523,179, filed on Mar. 10, 2000, now Pat. No. 6,803,337.

(30) Foreign Application Priority Data

Mar. 12, 1999 (IT) .............................. MI99A0504

(51) Int. Cl.
B01J 29/06 (2006.01)
C07C 5/27 (2006.01)
C10G 45/04 (2006.01)

(52) U.S. Cl. ............................. 502/60; 502/64; 502/66; 502/70; 502/74; 208/208 R; 208/209; 208/213; 208/216 R; 208/217; 585/671

(58) Field of Classification Search .................... 502/60, 502/64, 66, 70, 74; 208/208 R, 209, 213, 208/216 R, 217; 585/671

See application file for complete search history.

(56) References Cited

U.S. PATENT DOCUMENTS

| 3,536,606 | A | 10/1970 | Kittrell |
|---|---|---|---|
| 4,126,579 | A | 11/1978 | Flaherty, Jr. et al. |
| 4,299,733 | A | 11/1981 | Tu |
| 4,568,655 | A | 2/1986 | Oleck et al. |
| 4,844,792 | A | 7/1989 | Abdo et al. |
| 4,913,797 | A | 4/1990 | Albinson et al. |
| 5,011,593 | A | 4/1991 | Ware et al. |
| 5,275,720 | A | 1/1994 | Ward |
| 5,362,696 | A | 11/1994 | Takahashi et al. |
| 5,689,026 | A | 11/1997 | Wu et al. |
| 5,853,566 | A | 12/1998 | Kraushaar-Czarnetzki et al. |
| 5,865,988 | A | 2/1999 | Collins et al. |
| 5,866,744 | A | 2/1999 | Wu et al. |
| 5,906,729 | A | 5/1999 | Chou |
| 6,231,750 | B1 | 5/2001 | Kasztelan et al. |
| 6,524,470 | B1 * | 2/2003 | Kasztelan et al. ...... 208/111.05 |
| 6,803,337 | B1 | 10/2004 | Zanibelli et al. |
| 2004/0248726 | A1 | 12/2004 | Zanibelli et al. |
| 2006/0154814 | A1 | 7/2006 | Zanibelli et al. |

FOREIGN PATENT DOCUMENTS

| EP | 0 094 827 | 11/1983 |
|---|---|---|
| EP | 0 180 354 | 5/1986 |
| EP | 0 791 558 | 8/1997 |
| EP | 0 955 093 | 11/1999 |

OTHER PUBLICATIONS

US 5,352,644, 10/1994, Timken (withdrawn)

* cited by examiner

*Primary Examiner*—Elizabeth D Wood
(74) *Attorney, Agent, or Firm*—Oblon, Spivak, McClelland, Maier & Neustadt, L.L.P.

(57) ABSTRACT

The present invention relates to a catalytic composition which comprises a beta zeolite, a metal of group VIII, a metal of group VI B and optionally one or more oxides as carrier. The catalytic system of the present invention can be used for the hydrotreating of hydrocarbon mixtures and more specifically in the upgrading of hydrocarbon mixtures having boiling ranges within the range of 35° to 250° C., containing sulfur impurities, i.e. in hydrodesulfuration with contemporaneous skeleton isomerization and a reduced hydrogenation degree of olefins contained in said hydrocarbon mixtures, the whole process being carried out in a single step.

16 Claims, No Drawings

CATALYTIC COMPOSITION FOR THE UPGRADING OF HYDROCARBON MIXTURES

CONTINUING APPLICATION DATA

The present application is a Divisional of U.S. application Ser. No. 10/891,069, filed Jul. 15, 2004, now U.S. Pat. No. 7,156,980, which is a Continuation of U.S. application Ser. No. 09/523,179, filed Mar. 10, 2000, now U.S. Pat. No. 6,803,337.

The present invention relates to a catalytic composition which comprises a beta zeolite, a metal of group VIII, a metal of group VI B and optionally one or more oxides as carrier. The catalytic system of the present invention can be used for the hydrotreating of hydrocarbon mixtures and more specifically for the upgrading of hydrocarbon mixtures which boil within the naphtha range, containing sulfur impurities, i.e. in the hydrodesulfuration with contemporaneous skeleton isomerization and a reduced hydrogenation degree of the olefins contained in said hydrocarbons, the whole process being carried out in a single step. This catalytic system can be used, in particular, for the upgrading of mixtures of hydrocarbons which boil within the naphtha range deriving from cracking processes, preferably mixtures of hydrocarbons having a boiling point within the naphtha range deriving from FCC catalytic cracking (Fluid Catalytic Cracking).

Hydrocarbons which boil within the naphtha range deriving from FCC (i.e. gasoline cut) are used as blending component of gasolines. For this purpose, it is necessary for them to have a high octane number together with a low sulfur content, to conform with the law restrictions which are becoming more and more severe, in order to reduce the emission of contaminants. The sulfur present in gasoline mixtures in fact mainly comes (>90%) from the gasoline cut deriving from FCC.

This cut is also rich in olefins which have a high octane number. Hydrogenation processes used for desulfuration also hydrogenate the olefins present with a consequent considerable reduction in the octane number (RON and MON). The necessity has therefore been felt for finding a catalytic system which decreases the sulfur content in hydrocarbon mixtures which boil within the naphtha range and, at the same time, minimizes the octane loss (RON and MON), which can be achieved, for example, by the skeleton isomerization of the olefins present and/or by inhibiting the hydrogenation of the olefinic double bond.

The use of zeolites with a medium pore dimension as isomerization catalysts and the consequent recovery of octane in the charges already subjected to desulfuration are already known (U.S. Pat. Nos. 5,298,150, 5,320,742, 5,326,462, 5,318,690, 5,360,532, 5,500,108, 5,510,016, 5,554,274, 599,439). In these known processes, in order to obtain hydrodesulfuration with a reduced octane loss, it is necessary to operate in two steps, using in the first step catalysts suitable for desulfuration and in the second step catalysts for recovering the octane number.

U.S. Pat No. 5,378,352 describes a process in a single step for desulfurating hydrocarbon fractions, with boiling points within the range of gasolines, using a catalyst which comprises a metal Of group VIII, a metal of group VI, a zeolite selected from ZSM-5, ZSM-11, ZSM-22, ZSM-23, ZSM-35, ZSM-48, ZSM-50, MCM-22 and mordenite, and a metal oxide as ligand, with a process temperature preferably higher than 340° C.

Some catalytic materials containing metals of group VIII and group VI B, a refractory carrier and a zeolite selected from ZSM-35, ZSM-5, mordenite and fujasite, are described in EP 442159, EP 437877, EP 434123 for the isomerization and disproportions of olefins; in U.S. Pat. No. 4,343,692 for hydrodewaxing; in U.S. Pat No. 4,519,900 for hydrodenitrogenation, in EP 072220 for a process in two steps comprising dewaxing and hydrodesulfuration; in U.S. Pat. No. 4,959,140 for a hydrocracking process in two steps.

We have now surprisingly found a new catalytic system which can be used for the hydrotreating of hydrocarbon mixtures and, more specifically, we have found a catalytic system with which it is possible to desulfurate, with high conversion values, mixtures of hydrocarbons that boil within the naphtha range containing sulfur and olefins and contemporaneously obtain the skeleton isomerization of the olefins present with a low hydrogenation degree of the olefinic double bond. This new catalytic system is also active at temperatures and pressures that are lower than those preferably used in the known art for desulfuration Both skeleton isomerization and reduced olefinic hydrogenation enable hydrocarbon mixtures to be obtained, which boil within the naphtha range with very low RON (research octane number) and MON (motor octane number) losses.

The catalytic compositions of the present invention can not only be used for the desulfuration of hydrocarbon cuts that boil within the "heavy naphtha" range (130°-250° C.), i.e. cuts poor in olefins, but also feeds of "full range naphtha", which boil within the range of 35°-250°C., i.e. in the case of cuts rich in olefins. In fact, the catalytic system of the present invention has a high selectivity for desulfuration with respect to hydrogenation, which represents an additional advantage in terms of octane recovery in the end-gasoline.

A first object of the present invention therefore relates to a catalytic composition which comprises a beta zeolite, a metal of group VIII, a metal of group VI B, and optionally one or more oxides as carrier.

Beta zeolite is a porous crystalline material described in U.S. Pat. No. 3,308,069, having a molar composition of oxides corresponding to the following formula:

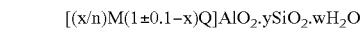

$$[(x/n)M(1\pm 0.1-x)Q]AlO_2.ySiO_2.wH_2O$$

wherein x is less than 1, preferably less than 0.75, y varies within the range of 5 to 100, w varies within the range of 0 to 4, M is a metal selected from metals of groups IA, IIA, IIIA, or is a transition metal, n is the valence of M and Q is a hydrogen ion, ammonium ion, an organic cation or a mixture of these. Preferably y is greater than 5 and less than 50.

According to a particularly preferred aspect of the present invention the beta zeolite is in acid form i.e. in the form in which the cationic sites of the zeolite are prevalently occupied by hydrogen ions. It is especially preferable for at least 80% of the cationic sites to be occupied by hydrogen ions.

According to an aspect of the present invention, when the catalytic composition comprises beta zeolite and metals of group VIII and group VI B, said zeolite is preferably present in a quantity ranging from 70 to 90%; when the catalytic composition also comprises one or more oxides as carrier, said zeolite is preferably present in a quantity ranging from 5 to 30% by weight with respect to the total weight of the catalyst.

The catalysts used in the present invention preferably contain Cobalt or Nickel as metal of group VIII, whereas the metal of group VI B is preferably selected from molybdenum or tungsten. According to a particularly preferred aspect, Co and Mo are used. The weight percentage of the metal of group VIII preferably varies from 1 to 10% with respect to the total weight of the catalyst, even more preferably from 2 to 6%; the weight percentage of the metal of group VI B preferably varies from 4 to 20% with respect to the total weight of the catalyst, even more preferably from 7 to 13%. The weight percentages of the metal of group VI B and the metal of group VIII refer to the content of metals expressed as metal element of group VI B and metal element of group VIII; in the end-catalyst the metals of group VI B and VIII are in the form of oxides. According to a particularly preferred aspect, the molar ratio between the metal of Group VIII and the metal of group VI B is less than or equal to 2, preferably less than or equal to 1.

The oxide used as carrier is preferably the oxide of an element Z selected from silicon, aluminum, titanium, zirconium and mixtures of these. The carrier of the catalytic composition can consist of one or more oxides and the oxide used is preferably alumina or alumina mixed with an oxide selected from silica and zirconia.

The catalytic compositions of the present invention can be prepared with traditional methods, for example by impregnation of the beta zeolite with a solution containing a salt of a metal of group VI B and a salt of a metal of group VIII, drying and calcination The impregnation can also be effected using a solution containing a salt of a metal of group VI B and a solution containing a salt of a metal of group VIII.

When the catalyst contains one or more oxides as carrier it can be prepared by mixing the zeolite with the oxide, followed by extrusion, calcination, an optional exchange process which reduces the sodium content, drying, impregnation with a solution containing a salt of a metal of group VI B, drying, calcination and impregnation with a solution of a salt of a metal of group VIII, drying and calcination.

According to a particularly preferred aspect of the present invention, the catalytic compositions which contain one or more oxides as carrier are prepared by means of the sol-gel technique as follows:
a) an alcoholic dispersion is prepared, containing a soluble salt of the metal of group VIII, beta zeolite and one or more organic compounds capable of generating the supporting oxide or oxides;
b) an aqueous solution is prepared containing a soluble salt of the metal of group VI B and, optionally, tetraalkylammonium hydroxide having the formula $R_4NOH$;
c) the alcoholic dispersion and the aqueous dispersion are mixed and a gel is obtained;
d) aging of the gel at a temperature ranging from 10 to 40° C.;
e) drying of the gel;
f) calcination of the gel.

The catalytic compositions thus obtained have a high surface area (>200 m$^2$/g) and a high pore volume (>0.5 cm$^3$/g) with a distribution within the mesoporosity range.

In step a) of this preparation, the metal salt of group VIII is, for example, a nitrate, a hydroxide, an acetate, an oxalate, and preferably a nitrate.

The organic compound capable of generating the supporting oxide or oxides, by means of hydrolysis and subsequent gelations and calcination, is preferably the corresponding alkoxide or alkoxides, in which the alkoxide substituents have the formula (R'O)— wherein R' is an alkyl containing from 2 to 6 carbon atoms. The alkoxide is preferably an element Z selected from silicon, aluminum, titanium, zirconium and their mixtures; in particular, when Z is aluminum, it is a trialkoxide having the formula $(R'O)_3Al$, wherein R' is preferably an isopropyl or a secbutyl; when Z is silicon, it is a tetraalkoxide having the formula $(R'O)_4Si$ wherein R' is preferably ethyl and, when Z is Zr, it is an alkoxide having the formula $(R'O)_4Zr$ wherein R' is preferably isopropyl.

In step b) the soluble salt of the metal of group VI B can be an acetate, an oxalate or ammonium salts, and is preferably an ammonium salt. The tetraalkylammonium hydroxide has the formula $R_4NOH$ wherein R is an alkyl group containing from 2 to 7 carbon atoms. According to a preferred aspect the solution in step b) also contains formamide (Drying Control Chemical Agent) which favours the stabilization of the porous structure during the drying phase.

The quantities of the reagents are selected in relation to the composition of the end-catalyst.

In step c), according to the preferred sequence, the solution of step b) is added to the suspension of step a).

In step d) the gel obtained is maintained at a temperature ranging from 10 to 40° C., for a time of 15-25 hours.

Step e) is carried out at a temperature ranging from 80 to 120° C.

Step f) is carried out at a temperature ranging from 400 to 600° C.

According to another aspect of the present invention, the catalytic system containing one or more oxides as carrier can be prepared as follows:
a) an alcoholic dispersion is prepared, containing beta zeolite and one or more organic compounds capable of generating the supporting oxide or oxides;
b) an aqueous solution is prepared containing tetraalkylammonium hydroxide having the formula $R_4NOH$;
c) the alcoholic dispersion and the aqueous dispersion are mixed and a gel is obtained;
d) aging of the gel at a temperature ranging from 10 to 40° C.;
e) drying of the gel;
f) calcination of the gel;
g) impregnation of the calcined product with a solution containing a salt of a metal of group VI B, drying, calcination and impregnation with a solution of a salt of a metal of group VIII, drying and calcination.

The quantities of the reagents are selected in relation to the composition of the end-catalyst. The reagents used are the same as the sol-gel synthesis.

According to another aspect of the present invention, the catalytic compositions containing the supporting oxide or oxides can be prepared as follows:
a) an alcoholic dispersion is prepared, containing a soluble salt of the metal of group VIII and one or more organic compounds capable of generating the supporting oxide or oxides;
b) an aqueous solution is prepared containing a soluble salt of the metal of group VI B and, optionally, tetraalkylammonium hydroxide having the formula $R_4NOH$;
c) the alcoholic dispersion and the aqueous dispersion are mixed and a gel is obtained;
d) aging of the gel at a temperature ranging from 10 to 40° C.;
e) drying of the gel;
f) mechanical mixing of the dried product with beta zeolite;
g) calcination.

The reagents used are the same as the sol-gel synthesis.
The quantities of the reagents are selected in relation to the composition of the end-catalyst.

According to another aspect of the present invention, the catalytic compositions containing one or more oxides as carrier can be prepared as follows:
a) impregnation of the carrier, consisting of one or more oxides, with a salt of a metal of group VI B and with a salt of a metal of group VIII,
b) drying and calcination of the material obtained in step a),
c) mixing of the impregnated oxide obtained in step b) with the beta zeolite.

The quantities of the reagents are selected in relation to the composition of the end-catalyst.

The impregnations of step a) are carried out with any traditional method, the salts of metals of groups VI B and VIII are in aqueous solution. When separate aqueous solutions for the metal of group VI B and for the metal of group VIII, are used, a drying and calcination step can be inserted between the two impregnations. Before step c) the impregnated oxide can be ground and sieved into particles of <0.2 mm and then, in step c), mixed with the zeolite by physical mixing or dispersing the particles in an organic solvent of the cyclohexane or cyclohexanol type. The solvent is vaporized and the particles of catalyst dried and calcined. The mixing of step c) can also be carried out by mixing and homogenizing a solid mixture comprising the impregnated oxide (with particle dimensions of <0.2 mm), the zeolite, a ligand and, optionally, combustible organic polymers. The mixture thus obtained can be mixed with a peptizing acid solution, extruded, dried and calcined with any traditional method. Alternatively, the paste can be pelletized, dried and calcined with any traditional method.

The catalysts used in the process of the present invention can be used as such or, preferably, extruded according to the known techniques, for example using a peptizing agent, such as a solution of acetic acid, and optionally a ligand of the pseudobohemite type, added to the catalyst to form a paste which can be extruded. In particular, when the catalysts are prepared by sol-gel, the addition of the ligand is not necessary during the extrusion process.

The materials of the present invention can be used as catalysts for the hydrotreating of hydrocarbon mixtures and more specifically for the upgrading of hydrocarbon mixtures which boil within the naphtha range.

A further object of the present invention therefore relates to the hydrotreating of hydrocarbon mixtures characterized by the use of a catalytic composition which comprises a beta zeolite, a metal of group VIII, a metal of group VI B, and optionally one or more oxides as carrier.

In accordance with this, a particularly preferred aspect of the present invention relates to the hydrodesulfuration of hydrocarbon mixture having boiling ranges within the range of about 35° to about 250° C., containing olefins and at least 150 ppm of sulfur, with the contemporaneous skeleton isomerization of these olefins, which comprises putting these mixtures in contact, in the presence of hydrogen, with a catalytic composition which comprises a beta zeolite, a metal of group VIII, a metal of group VI B, and optionally one or more oxides as carrier.

When the catalytic composition containing the beta zeolite, a metal of group VI B and a metal of group VIII, is used, the process of the present invention is carried out at a temperature ranging from 220 to 360° C., preferably between 300 and 350° C., at a pressure ranging from 5 to 20 kg/cm$^2$, at a WHSV ranging from 1 to 10 hours$^{-1}$. The quantity of hydrogen is between 100 and 500 times the quantity of hydrocarbons present (Nl/l).

When the catalytic composition also contains one or more oxides as carrier, the hydrodesulfuration process and contemporaneous skeleton isomerization of the olefins present is carried out at a temperature ranging from 220 to 320° C., preferably between 250 and 300° C., at a pressure ranging from 5 to 20 kg/cm$^2$, and a WHSV between 1 and 10 hours$^{-1}$. The quantity of hydrogen is between 100 and 500 times the quantity of hydrocarbons present (Nl/l)

The hydrocarbon mixture which can be desulfurated according to the present invention contains more than 150 ppm of sulfur. For example hydrocarbon mixtures with a sulfur content of more than 600 ppm, or even higher than 10,000 ppm can be subjected to hydrodesulfuration.

The hydrocarbon mixtures which are preferably subjected to hydrodesulfuration boil within the range of $C_5$ to about 220° C., $C_5$ referring to the boiling point of a mixture of hydrocarbons with five carbon atoms.

The catalysts of the present invention are activated, before use, by sulfidation according to the known methods. According to a particular aspect of the present invention, it is possible to effect the desulfuration and isomerization process in a reactor in which the catalytic composition is divided into two beds, the first containing the beta zeolite, the second containing the remaining catalytic component containing a metal of group VI B, a metal of group VIII and one or more oxides as carrier.

EXAMPLE 1

Preparation of Catalyst A 1.17 g of $Co(NO_3)_2.6H_2O$ (CoN) are dissolved in 53.32 g of BuOH, at room temperature. 0.79 g of beta zeolite (in acid form, with a ratio $SiO_2/Al_2O_3=26.3$, prepared in accordance with U.S. Pat. No. 3,308,069) are added, which are suspended in the alcoholic solution, heating to 60° C. for 10 minutes. 30.33 g of $Al(OC_4H_9)_3$ (aluminum sec-butoxide) are added to this suspension which is heated to 60° C. for 20 minutes, obtaining the suspension A1.

1.66 g of $(NH_4)_6Mo_7O_{24}.4H_2O$ (ammonium heptamolybdate, EMA) are dissolved in 19.60 g of $(C_3H_7)_4NOH$ (tetrapropyl ammonium-hydroxide, TPAOH, solution at 19.2%), at room temperature, obtaining the solution A2 (pH=10). Solution A2) is slowly poured into the suspension A1), under heating and under stirring, obtaining a highly viscous fluid which is maintained at 80° C. for 1 hour. This is followed by aging at room temperature for 21 hours, drying in a vacuum oven at 100° C. for 6 hours, calcination in muffle with the following temperature program: heating to 200° C. (5° C./min); a pause at 200° C. for 2 hours; heating to 550° C. (5° C./min); a pause at 550° C. for 3 hours; spontaneous cooling to room temperature. The characteristics of the material are indicated in Table 1, wherein $A_{surf}$ is the surface area and $V_{pores}$ is the pore volume.

EXAMPLE 2

Preparation of Catalyst B 1.37 g of CoN are dissolved in 36.28 g of BuOH, at room temperature. 2.05 g of the beta zeolite of example 1, are added, which are suspended in the alcoholic solution, heating to 50° C. for 10 minutes. 32.26 g of $Al(OC_4H_9)_3$ (aluminum sec-butoxide) are added to this suspension which is heated to 60° C. for 20 minutes, obtaining a suspension B1.

1.61 g of EMA are dissolved in 18.60 g of TPAOH (solution at 19.2%), at room temperature, obtaining the solution B2 (pH=10).

The solution B2 is slowly poured into the suspension B1, under heating and under stirring, obtaining a highly viscous fluid which is maintained at 80° C., for 1 hour. This is followed by aging at room temperature for 19 hours, drying in a vacuum oven at 100° C. for 6 hours, and calcination in muffle with the temperature profile indicated in example 1. The characteristics of the material are indicated in Table 1.

EXAMPLE 3

Preparation of Catalyst C (Comparative)

A comparative catalyst is prepared as described in EP 748652. 1.04 g of CoN are dissolved in 47.16 g of BuOH, at room temperature. 1.03 g of $Si(OC_2H_5)_4$ (Tetraethylorthosilicate) and 26.53 g of $Al(OC_4H_9)_3$ (aluminum secbutoxide) are added and the mixture is heated to 60° C. for 10 minutes, obtaining the suspension C1.

1.47 g of EMA are dissolved in 17.56 g of TPAOH (solution at 19.2%), at room temperature, obtaining the solution C2, (pH=11).

The solution C2) is slowly poured into the suspension C1), under heating and under stirring, obtaining a highly viscous fluid which is maintained at 60° C., for 1 hour. This is followed by aging at room temperature for 21 hours, drying in a vacuum oven at 100° C. for 6 hours, and calcination in muffle under the same conditions as in example 1. The characteristics of the material are indicated in Table 1.

EXAMPLE 4

Preparation of Catalyst D (Comparative)

A comparative catalyst is prepared as described in EP 748652. 3.30 g of CoN are dissolved in 47.48 g of BuOH, the temperature being maintained at 60° C. for 15 minutes. 1.00 g of $Si(OC_2H_5)_4$ (Tetraethyl-orthosilicate) and 25.10 g of $Al(OC_4H_9)_3$ (aluminum sec-butoxide) are added and the mixture is heated to 60° C. for 15 minutes, obtaining the suspension D1.

3.20 g of EMA are dissolved in 33.00 g of TPAOH (solution at 19.2%), at room temperature, obtaining the solution D2, (pH=11)

The solution D2) is slowly poured into the suspension D1), under heating and under stirring, obtaining a highly viscous fluid which is maintained at 60° C., for 1 hour. This is followed by aging at room temperature for 16 hours, drying in a vacuum oven at 100° C. for 6 hours, and calcination in muffle under the same conditions as example 1. The characteristics of the material are indicated in Table 1.

EXAMPLE 5

Preparation of Catalyst E (Comparative)

1.18 g of CoN are dissolved in 36.17 g of BuOH at room temperature. 0.63 g of commercial ZSM-5 zeolite (PQ 3070E) are added, and are suspended in the alcohol solution, heating to 50° C., for 10 minutes. 30.11 g of $Al(OC_4H_9)_3$ (aluminum sec-butoxide) are added to this suspension and the mixture is heated to 60° C. for 20 minutes, obtaining the suspension E1.

1.67 g of EMA are dissolved in 19.41 g of TPAOH (solution at 19.2%), at room temperature, obtaining the solution E2, (pH=10).

The solution E2) is slowly poured into the suspension E1), under heating and under stirring, obtaining a highly viscous fluid which is maintained at 80° C., for 1 hour. This is followed by aging at room temperature for 22 hours, drying in a vacuum oven at 100° C. for 6 hours, and calcination in muffle with the temperature program indicated in example 1. The characteristics of the material are indicated in Table 1.

EXAMPLE 6

Catalyst F (Comparative)

A reference commercial catalyst is used consisting of a system based on alumina, cobalt and molybdenum. The characteristics of this catalyst are indicated in Table 1

TABLE 1

| Catalyst | Zeolite (w %) | Co (w %) | Mo (w %) | Co/Mo (mol) | $A_{surf}$ ($m^2/g$) | $V_{pores}$ ($cm^3/g$) |
|---|---|---|---|---|---|---|
| A | 9.0 beta | 2.2 | 8.1 | 0.44 | 380 | 1.10 |
| B | 19.6 beta | 2.5 | 8.2 | 0.49 | 465 | 1.24 |
| C | — | 2.3 | 8.9 | 0.42 | 360 | 0.74 |
| D | — | 6.8 | 18.1 | 0.61 | 430 | 0.72 |
| E | 7.4 ZSM-5 | 2.8 | 10.5 | 0.45 | 410 | 1.05 |
| F | — | 3.2 | 12.0 | 0.43 | 245 | 0.51 |

Catalytic Tests On Model Charge

The catalytic results obtained by treating a feed, defined as model charge, representative of the composition of an FCC gasoline in terms of S content and olefinic cut, are provided hereunder. The model charge has the following composition:

30% by weight of 1-pentene;

0.25% by weight of thiophene (1000 ppm S);

the complement to 100 is n-hexane.

The catalysts are all activated following the same procedure, in a stream of $H_2S/H_2$.

The catalytic activity is evaluated using the following parameters:

a) hydrodesulfuration conversion (HDS %) calculated as follows:

HDS %=100×(ppm $S_{in}$–ppm $S_{out}$)/ppm $S_{in}$ b) isomerizing properties ISO % calculated as follows:

ISO %=100×(i-pentanes+i-pentenes)/$\Sigma C_5$ c) hydrogenating property HYD % calculated as follows:

HYD %=100×(n-pentane$_{out}$/1-pentene$_{in}$)

EXAMPLE 6

Catalytic Activity of Catalyst A 2 g of catalyst A, diluted with corundum, are charged into a reactor (40-70 mesh) and activated in the presence of $H_2S/H_2$ (10% vol) up to 400° C. for 3 hours; the system is then brought under $H_2$ pressure up to 10 bars and the model feed is sent, with a ratio $H_2$/hydrocarbon charge equal to 300 Nl/l. The operating conditions and catalytic results are indicated in Table 2.

EXAMPLE 7

Catalytic Activity of Catalyst B 2 g of catalyst B are treated as in example 6 as regards the activation procedure and then tested on the model charge under the operating conditions described in Table 2, which also indicates the catalytic results.

EXAMPLE 8

Catalytic Activity of Catalyst D 2 g of catalyst D are treated as in example 6 as regards the activation procedure and then tested on the model charge under the operating conditions described in Table 2, which also indicates the catalytic results.

EXAMPLE 9

Catalytic Activity of Catalyst E 2 g of catalyst E are treated as in example 6 as regards the activation procedure and then tested on the model charge under the operating conditions described in Table 2, which also indicates the catalytic results.

EXAMPLE 10

Catalytic Activity of Catalyst F 2 g of catalyst F are treated as in example 6 as regards the activation procedure and then tested on the model charge under the operating conditions described in Table 2, which also indicates the catalytic results.

TABLE 2

| CATALYST | T (° C.) | WHSV (hrs$^{-1}$) | HDS (%) | ISO (%) | HDS/HYD | HYD/ISO |
|---|---|---|---|---|---|---|
| A | 256 | 4.3 | 84.1 | 15.5 | 2.1 | 2.6 |
| A | 295 | 10.0 | 96.9 | 14.7 | 1.7 | 3.9 |
| C | 254 | 6.6 | 91.0 | 2.5 | 1.2 | 29.9 |
| C | 282 | 6.6 | 92.7 | 2.5 | 0.9 | 40.4 |
| D | 273 | 3.9 | 88.0 | 0.7 | 1.0 | 120.95 |
| D | 290 | 3.9 | 95.0 | 0.7 | 1.05 | 127.9 |
| E | 254 | 3.3 | 40.3 | 13.3 | 0.7 | 4.5 |
| F | 250 | 4.0 | 89.7 | 2.5 | 2.4 | 15.0 |

The catalyst of the present invention (A) increases the isomerizing activity by about one order of magnitude, with respect to those without zeolite, regardless of the fact that the metal content is the same, as in catalyst C, or double, as in catalyst D. This is also observed with respect to the commercial catalyst F.

The presence of beta zeolite increases the HDS conversion with respect to the HYD hydrogenating properties, as is demonstrated by the higher value of the HDS/HYD ratio and also reduces hydrogenation with respect to isomerization (lower value of the HYD/ISO ratio), with respect to both the compositions without zeolite (C and D) and to the catalyst with ZSM-5 zeolite (E).

In addition the catalyst of the present invention also reaches a high HDS at a bland temperature (T=256° C.) and in particular is double with respect to the catalyst E, containing ZSM-5.

The high values for the HDS/HYD ratio and low values for the HYD/ISO ratio (i.e. high desulfuration with a reduced hydrogenating activity and high skeleton isomerization) show how the catalysts of the present invention are capable of recovering the octane loss in hydrocarbon mixtures which are subjected to hydrodesulfuration, having boiling ranges within the range of 35° to 250° C., containing olefins and at least 150 ppm of sulfur.

The invention claimed is:

1. A catalytic composition having a surface area $\geq 380$ m$^2$/g and a pore volume $\geq 1.10$ cm$^3$/g consisting of:
   one or more oxides as a carrier, a beta zeolite, cobalt, a metal of Group VI B, wherein the weight percentage of cobalt varies from 1 to 10% with respect to the total weight of the catalytic composition, the weight percentage of the metal of Group VI B varies from 4 to 20% with respect to the total weight of the catalytic composition, and wherein cobalt and the metal of Group VI B are present in a molar ratio not greater than 2.

2. The catalytic composition according to claim 1, wherein the beta zeolite is in the form in which the cationic sites of the zeolite are prevalently occupied by hydrogen ions.

3. The catalytic composition according to claim 2, wherein at least 80% of the cationic sites is occupied by hydrogen ions.

4. The catalytic composition according to claim 1, wherein said zeolite is present in a quantity ranging from 70 to 90% by weight.

5. The catalytic composition according to claim 1, wherein said zeolite is present in a quantity ranging from 5 to 30% by weight with respect to the total weight of the catalyst.

6. The catalytic composition according to claim 5, which also contains Nickel.

7. The catalytic composition according to claim 1, wherein the metal of group VI B is tungsten.

8. The catalytic composition according to claim 1, wherein the metal of group VI B is Mo.

9. The catalytic composition according to claim 1, wherein the weight percentage of cobalt varies from 2 to 6% with respect to the total weight of the catalyst.

10. The catalytic composition according to claim 1, wherein the weight percentage of the metal of group VI B varies from 4 to 20% with respect to the total weight of the catalyst.

11. The catalytic composition according to claim 10, wherein the weight percentage of the metal of group VI B varies from 7 to 13%.

12. The catalytic composition according to claim 1, wherein the molar ratio between the cobalt and the metal of group VI B is less than or equal to 2.

13. The catalytic composition according to claim 12, wherein the molar ratio between the cobalt and the metal of group VI B is less than or equal to 1.

14. The catalytic composition according to claim 1, wherein the oxide or oxides used as carrier are oxides of an element Z selected from silicon, aluminum, titanium, zirconium and mixtures of these.

15. The catalytic composition according to claim 14, wherein the oxide is selected from alumina or alumina mixed with an oxide selected from silica and zirconia.

16. A process hydrotreating hydrocarbon mixtures, comprising contacting one or more hydrocarbons with the catalytic composition of claim 1.

* * * * *